March 4, 1930. H. WINDHOFF 1,749,683
INTERNAL COMBUSTION ENGINE
Filed Oct. 14, 1926
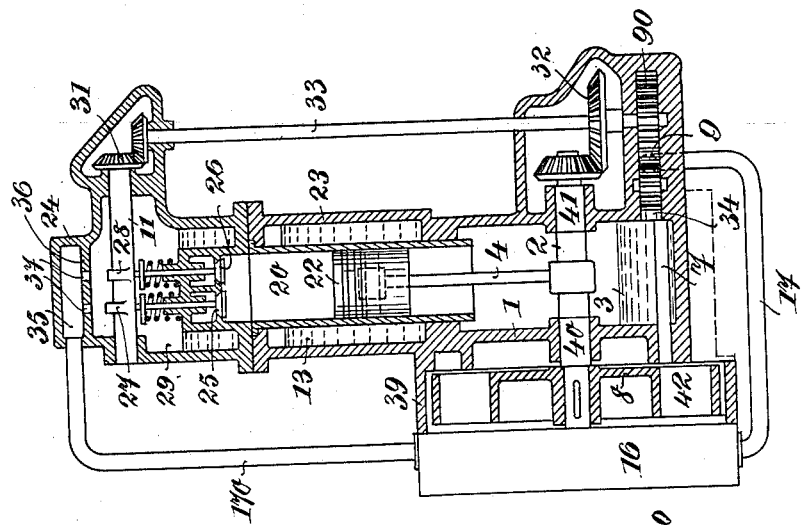
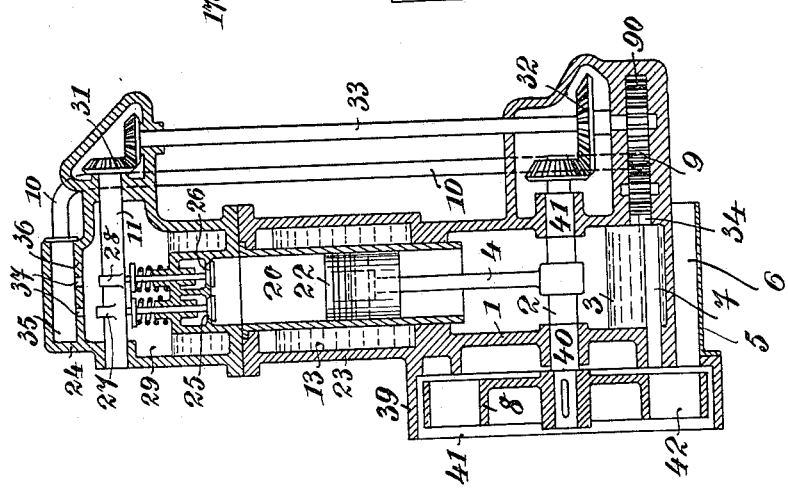
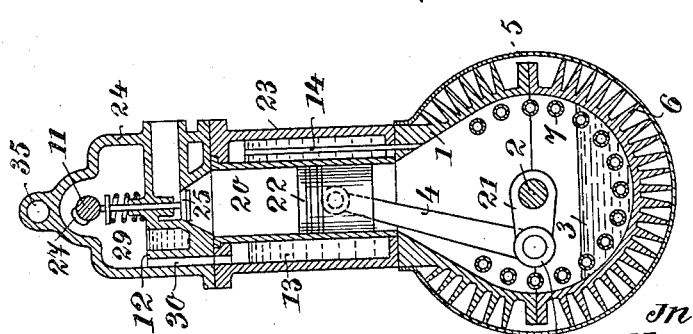
Inventor:
Hans Windhoff.
by:
Marks & Clerk
Attorneys Patented Mar. 4, 1930

1,749,683

UNITED STATES PATENT OFFICE

HANS WINDHOFF, OF BERLIN, GERMANY

INTERNAL-COMBUSTION ENGINE

Application filed October 14, 1926, Serial No. 141,555, and in Germany August 20, 1926.

Known internal combustion engines are cooled either by air, by means of a ribbed or gilled jacket, or are provided with water cooling apparatus. For the operating of such a cooling device there belongs a special radiator, to which in most cases a special fan is also added. Air cooling is only usable in comparatively few cases. The more generally used water cooling just described makes the plant as a whole rather complicated, as the special radiating body increases the weight of the motor plant takes up rather a considerable amount of space, and, more particularly in internal combustion engines on vehicles, renders access to the motor more difficult. In addition there are difficulties as regards fluidtightness, and the radiators are liable to leak. For the operating of the fan a special belt is frequently necessary.

All these disadvantages, which, in the internal combustion engine according to the invention, are obviated. The solution of the problem resides in the fact that the oil, which in any case would be required for lubricating purposes, also serves to cool the working cylinder. In this way the same medium that serves as a cooling medium is also employed for the lubrication in the first place of the inner jacket of the cylinder and in the second place of the other working parts of the engine. The boiling point of this oil lies considerably above that of water. Consequently its capacity for the withdrawal of heat is considerably higher. On account of this the quantity of cooling fluid in circulation need not be so great as the quantity required to be in circulation in the case of water cooling. For the re-cooling of this oil, however, on the same grounds, considerably smaller surfaces are also required. Consequently an internal combustion engine can be constructed according to the present invention, wherein the same kind of oil is utilized both for the lubrication and as a cooling medium, without any independent radiator, thus effecting a considerable saving in space, making the entire structure cheaper, and obviating all the above mentioned disadvantages associated with the special radiator.

It has already been proposed to lodge oil in the crank casing and to convey it from there to the lubricating points. In many motors also it is re-cooled, as part of the heat of the cylinder, and the heat produced by friction of the working parts and communicated to the oil, must be withdrawn from the oil. In the subject-matter of this invention also it is most advantageous to lodge the oil for the lubrication of the working parts, namely the crank head, the crank bearing, the piston pin and the cylinder wall, in a known manner in the crank casing and to convey it to the said frictional points to be lubricated by the splashing caused by the dipping of the connecting rod during the running of the motor. Furthermore however oil out of the crank chamber is also supplied to the cooling jacket of the working cylinder apparatus, for the purpose of passing it back into the crank casing after it has there taken up the heat arising from the work done.

Now since by the dipping of the connecting rod with the crank the oil is splashed over the entire surface of the crank casing, heat is also withdrawn from it over this entire surface, if the crank casing is provided externally with cooling ribs. In addition to this or instead of it, however, cooling tubes may be passed through the crank casing. The scrubbing air, which has to pass through the crown of ribs or through these cooling tubes, may be conveyed by constructing the fly wheel as a fan. Since, as set forth above, the cooling surface needs to be smaller than in the case of water cooling, and since a special radiator block is no longer necessary, and moreover the flywheel can be fitted directly in front of the crank case and constructed and used as a fan, a very compact general arrangement of the engine is the result.

The accompanying drawings show two constructional examples of a single-cylinder internal combustion engine according to the invention.

Figs. 1 and 2 show one construction in longitudinal sections at right angles to each other, and Fig. 3 shows a modification of the construction shown in Figs. 1 and 2 in which an additional radiator is provided for cooling the oil, also in longitudinal section.

In the accompanying drawings two constructional examples of the invention are illustrated, the first in Figures 1 and 2, which are two longitudinal sections perpendicular to one another, and the second in Figure 3, in longitudinal section.

In both cases there is connected with the working cylinder 20 the crank casing 1, in which is journalled the shaft 2 with the crank 21 and the connecting rod 4. The latter is pivotally connected with the piston 22. Around the cylinder 20 there is an outer jacket 23, and between this and the cylinder 20 there is an annular cooling chamber 13. With the cylinder body 20, 23 is connected by screws the head attachment 24, which contains the controlling valves 25 and 26 and the shaft 11 for the controlling cams 27 and 28. In the space 29 is located an overflow 12, (see the constructional example according to Figures 1 and 2), from which a duct 30 leads to the jacket space 13. In the latter is located an overflow pipe 14, which leads into the crank chamber. The cam shaft 11 is connected by bevel gears 31 and 32 and an intermediate vertical shaft 33 with the crank shaft 2. Into the crank casing there opens a space 34, in which there is a circulating pump 9. This consists, in the example illustrated, of a so-called geared pump, the driving wheel 90 of which is mounted on the upright shaft 33. From the space 34 a tube 10 leads to a space 35 in the head 24. In the bottom 36 there are apertures 37, which are preferably located above the cams 37 and 38 on the cam shaft 11.

The shaft 2 journalled at 40 and 41 carries the flywheel 8. The latter is located, in both constructional examples, close beside the crank casing, within a chamber 41 formed by a cylinder 39. The diameter of the cylinder is greater than that of the flywheel 8, as this is formed into a fan by vanes 42.

In the case of the constructional examples illustrated the flywheel diameter is such that it is less than the internal diameter of the crank chamber, so that tubes 7 lodged in the latter, which pass transversely through the crank chamber in the arrangement according to Figure 1, open in front of the fan vanes 42.

In the constructional example according to Figs. 1 and 2, ribs 6 are arranged around the outside of the crank casing 1 and within an outer jacket 5. The method of operation of the oil in the case of an internal combustion engine according to Figures 1 and 2 is as follows:—

The oil 3 in the crank chamber 1 is lashed and splashed by the crank 21 and the connecting rod 4 and strikes not only against the crank head 19 and the pivotal connection of the piston 22 to the connecting rod 4, but also in a known manner against the internal surface of the working cylinder 20 and over the entire surface of the inner crank chamber. It lubricates these parts and takes up heat from them. The circulating pump 9 delivers oil from the crank chamber 1 through the pipe 10 to the space 35. From there the oil passes through the apertures 36 and 37 into the cavity 29 in the head 24, and then on to the cams 27 and 28, so that their engagement with the rams or thrust rods of the valves 25 and 26 is lubricated. The oil collects in the chamber 29, and rises until it reaches the level of the overflow 12. Then it passes through the passage 30 into the jacket space 13 arranged round the cylinder 20 and rises here until it can fall back into the crank chamber through the overflow pipe 14. The heat arising from the work done in the working cylinder 20 is given up to the oil in the space 13, and the working heat of the cylinder head to the oil in the space 29, which also passes over into the space 13. Hence warm oil finally passes through the pipe 14 back into the crank chamber, to be cooled here in the following manner. The fan draws air through the pipes 7 and the spaces between the cooling ribs 6 within the outer casing 5. This air directly cools, by means of the tubes 7, the oil that is being splashed about in the crank chamber, and takes away from the ribs 6 the heat transmitted to them through the jacket of the crank chamber. Under these circumstances the tubes 7 may be omitted if desired, if the action of the cooling ribs is sufficiently effective.

An engine as described does not need a special radiator.

Nevertheless, if circumstances make it desirable, if for example it is not desired to provide the crank casing with cooling ribs, it is also possible to provide a special radiator. One constructional example is shown in Figure 3. The same reference numerals denote the same or corresponding parts as in the constructional example according to Figures 1 and 2. The distinction is that from the chamber of the circulating pump 9 a rising pipe 10 does not lead directly to the space 35 but a pipe 17 goes to a radiator 16 specially arranged in front of the flywheel 8 with its fan arrangement 42, from which radiator a pipe 170 then leads to the space 35. For the rest, the space 29 is connected with the space 13, as in the case of the first constructional example, through an overflow passage 30 not shown, and the cooling chamber 13 with the interior of the crank casing through an overflow passage 14, not shown. Also the other arrangements, in the case of this constructional example may be as in the case of the former, only that the ribs 6 and the enclosing casing 5 are omitted.

The oil cooling, independently of the special method of construction, also has the advantage that the internal combustion engine provided with it is protected from freezing.

What I claim is:

1. An internal combustion engine, comprising means for cooling the engine cylinder with the oil that is used for lubricating the working parts of the engine, a crank casing adapted to contain oil for splash lubrication, a fan arranged directly in front of one end of the crank casing, a radiator arranged in front of said fan and means for supplying warm oil from the crank chamber to the radiator to be cooled.

2. An internal combustion engine, comprising means for cooling the engine cylinder with the oil that is used for lubricating the working parts of the engine, a crank casing adapted to contain oil for splash lubrication, a fan arranged directly in front of one end of the nearly circular crank casing and concentrically to the crank shaft, tubes extending through the crank chamber and lying circularly under and above the crank shaft near the wall of the crank chamber, the tubes opening to the atmosphere at both ends, one end of each tube opening within the working range of the fan.

In testimony whereof I have signed my name to this specification.

HANS WINDHOFF.